(12) United States Patent
Panzram et al.

(10) Patent No.: US 8,788,085 B2
(45) Date of Patent: Jul. 22, 2014

(54) FULLY AUTOMATED CARGO LOADING SYSTEM

(71) Applicant: Airbus Operations GmbH, Hamburg (DE)

(72) Inventors: Uwe Panzram, Ganderkesee (DE); Volker Hasbach, Oldenburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/771,724

(22) Filed: Feb. 20, 2013

(65) Prior Publication Data

US 2013/0166063 A1 Jun. 27, 2013

Related U.S. Application Data

(63) Continuation of application No. PCT/EP2011/064398, filed on Aug. 22, 2011.

(60) Provisional application No. 61/375,960, filed on Aug. 23, 2010.

(30) Foreign Application Priority Data

Aug. 23, 2010 (DE) .................. 10 2010 035 099

(51) Int. Cl.
*G06F 7/00* (2006.01)
(52) U.S. Cl.
USPC ........... 700/213; 700/214; 700/217; 700/218; 700/219; 700/228; 700/229; 700/230

(58) Field of Classification Search
None
See application file for complete search history.

(56) References Cited

U.S. PATENT DOCUMENTS

| 4,379,535 | A | 4/1983 | Baldwin et al. | |
|---|---|---|---|---|
| 2003/0156914 | A1* | 8/2003 | Huber | 410/80 |
| 2006/0186271 | A1 | 8/2006 | Jacobsen et al. | |
| 2011/0313563 | A1* | 12/2011 | Huber | 700/214 |

FOREIGN PATENT DOCUMENTS

| DE | 2908400 A1 | 9/1980 |
|---|---|---|
| DE | 10338704 A1 | 3/2005 |
| DE | 102008056783 A1 * | 5/2010 |
| GB | 1277892 | 6/1972 |
| GB | 2058371 A | 4/1981 |
| WO | 2010127733 A2 | 11/2010 |

OTHER PUBLICATIONS

International Searching Authority, International Search Report and Written Opinion dated Dec. 5, 2011 for International Application No. PCT/EP2011/064398.
German Patent Office, German Office Action dated Jul. 29, 2011 for German Patent Application No. 102010035099.0.

* cited by examiner

*Primary Examiner* — Yolanda Cumbess
(74) *Attorney, Agent, or Firm* — Ingrassia Fisher & Lorenz P.C.

(57) ABSTRACT

Systems and methods are provided for the loading and unloading of cargo in transport means. In one example, a cargo loading system having a fully automated conveyor system and a fully automated bolt system for locking the cargo unit is provided. Manual interventions of the loading personnel in the cargo space may not be necessary.

16 Claims, 6 Drawing Sheets

FULLY AUTOMATED CARGO LOADING SYSTEM

CROSS-REFERENCE TO RELATED APPLICATIONS

This is a continuation of International Application No. PCT/EP2011/064398, filed Aug. 22, 2011, which application claims priority to German Patent Application No. 10 2010 035 099.0, filed Aug. 23, 2010 and to U.S. Provisional Patent Application No. 61/375,960, filed Aug. 23, 2010, which are each incorporated herein by reference in their entirety.

TECHNICAL FIELD

The technical field relates to the loading of cargo. In particular, the technical field relates to a cargo loading system for a cargo space of a transport means, an aircraft having such a cargo loading system, and a method for a fully automatic loading and unloading of a cargo space of a transport means.

BACKGROUND

Aircraft cargo spaces are equipped with a corresponding cargo loading system (CLS) for loading and unloading the corresponding cargo space with cargo units. The cargo units, so-called Unit Load Devices (ULDs), may be moved on roller tracks and ball mats and may be secured at the placement location by bolt systems.

In a solely mechanical system, the ULDs may be moved manually, for example, pushed by loading personnel. In an electrical system, the transport may be performed by corresponding drives in the cargo space floor. The control of the drives may be performed by the loading personnel located at one or more operating elements.

The locking of the ULDs at the placement location may also be performed manually in each case by the loading personnel. The loading personnel may learn the arrangement of the ULDs in the cargo space via corresponding loading plans, which are provided in paper form or on a mobile electronic display device (e.g., a tablet PC). The ULDs may be identified via unique numbers, using which the ULD is characterized.

DE 10 2005 008 443 B4 and EP 1 695 908 A3 describe loading devices for the partially automated loading and unloading of a cargo space of a transport means. Conveyor apparatuses for positioning cargo units in the area of a footprint of the cargo space are provided, which each have a sensor means situated in a housing of the corresponding conveyor apparatus, using which the presence of a cargo unit in the area of the conveyor apparatus may be detectable in a contact-free manner. A control and regulating unit may be provided, which accepts commands from a human operator with the aid of operating and control elements.

In addition, other objects, desirable features and characteristics will become apparent from the subsequent summary and detailed description, and the appended claims, taken in conjunction with the accompanying drawings and this background.

SUMMARY

A cargo loading system for a cargo space of a transport means such as a cargo hold in an aircraft, an aircraft having such a cargo loading system, and a method for a fully automated loading and unloading of a cargo space of a transport means are provided according to the various teachings of the present disclosure.

The exemplary embodiments described hereafter relate equally to the cargo loading system, the transport means, and the method. In other words, features which are described hereafter with respect to the cargo loading system, for example, may also be implemented in the method, and vice versa.

According to one of various aspects of the present disclosure, a cargo loading system for a cargo space of a transport means is provided, which has a conveyor system and a bolt system. The conveyor system comprises one or more transport modules for a fully automated transport of a cargo unit from an entry of the cargo space to a final position in the cargo space and the bolt system comprises one or more bolt modules for a fully automated locking of the freight unit in the final position.

The intervention of operating personnel for the transport and the locking of the ULD may no longer be necessary, since it is a fully automated system. In one example, the bolt modules no longer have to be operated by hand or checked by the operating personnel. The activation of the system may be performed automatically by the identification of the cargo and a comparison of a target situation with an actual situation (i.e. a comparison of the target data according to loading or unloading instructions with the measured data of a sensor system) or manually by operation of an operating unit by the loading personnel.

Such a cargo loading system may be used in particular in aircraft types whose low cargo space height is no longer suitable for manual operation. Suitable control software may be provided, which may ensure reliable and safe control and/or regulation of the loading and unloading procedures in combination with an extensive sensor system. In one example, the individual bolt modules may be automatically activated and monitored with the support of sensors, so that the presence of operating personnel in the cargo space may no longer be required.

In this way, aircraft cargo spaces may thus be loaded and unloaded with containers and pallets (ULDs) fully automatically.

The so-called turnaround process in the field of air freight may be optimized in this way and the loading and unloading procedures may be made easier for the operating personnel.

It is to be noted here that the transport means may be an aircraft, such as an airship, helicopter, or airplane, a rail vehicle, a road vehicle, or a water vehicle.

According to one exemplary embodiment of the present disclosure, the conveyor system has an air cushion system or electrical drives. A combination of an air cushion system and electrical drives may also be provided.

According to another exemplary embodiment of the present disclosure, the bolt module has a stepping motor for the automated locking and unlocking of the cargo unit.

According to another exemplary embodiment of the present disclosure, the bolt module has a lift cylinder for the automated locking and unlocking of the cargo unit. This lift cylinder may be driven electrically or pneumatically, or alternatively also hydraulically.

According to another exemplary embodiment of the present disclosure, the cargo loading system further has an automated identification system having an identification module for the automated identification of the cargo unit.

Furthermore, according to another exemplary embodiment of the present disclosure, a sensor system may be provided, having one or more sensor modules for recognizing and tracking the cargo unit during its movement through the cargo space.

Individual sensors may be attached to the transport modules or bolt modules or integrated therein, for example.

According to another exemplary embodiment of the present disclosure, the sensor system is implemented to recognize whether a high loader is positioned at the entry of the cargo space of the transport means to receive the cargo unit.

In this way, the fully automated cargo loading system may also be extended to the external area of the cargo space, i.e. the area outside the transport means. If the sensor system detects that the high loader is ready as intended, the corresponding ULD is transported fully automatically from the cargo space to the high loader and then transported further by the high loader.

According to another exemplary embodiment of the present disclosure, the cargo loading system has a data interface for receiving an external loading instruction. This loading instruction may be generated by an off-board central office, for example, and then transmitted wirelessly to the data interface and therefore to the cargo loading system. Furthermore, a control unit may be provided, which executes the loading instruction, i.e., controls and/or regulates the conveyor system on the basis of the loading instruction.

In this way, the loading and unloading procedure may be externally triggered and then performed fully automatically.

According to another exemplary embodiment of the present disclosure, the control unit is implemented for comparing TARGET data to ACTUAL data. The TARGET data are data which correspond to the loading instruction, i.e., describe which ULD is to be placed and locked where in the cargo space. The ACTUAL data are data which are provided by the sensor system of the cargo loading system and correspond to an ACTUAL state in the cargo space.

Through the comparison of the TARGET data to the ACTUAL data, it may be possible to detect malfunctions of individual components of the cargo loading system, analyze them, and, in the ideal case, even compensate for or correct them.

In one example, a regulating unit may be provided for this purpose, which may ensure that the ACTUAL state approximates the TARGET state.

If a malfunction is detected which cannot be corrected, an error message is sent, for example, to the onboard personnel, the cockpit crew, or a central unit, which may be located outside the transport means.

According to another exemplary embodiment of the present disclosure, the cargo loading system further has a display and signal unit, which is situated on the cargo space and is implemented to receive information data from the control unit and to display the information data to a user.

The display and signal unit may also be a mobile device, which can communicate via a wireless interface with the control unit.

According to one of various aspects of the present disclosure, an aircraft having a cargo loading system as described above and hereafter is provided.

According to another one of various aspects of the present disclosure, a method for a fully automated loading and unloading of a cargo space of a transport means, which is the cargo space of an aircraft, for example, is provided. In the method, a cargo unit is transported from an entry of the cargo space to a final position in the cargo space fully automatically. Furthermore, it is established or confirmed fully automatically whether the cargo unit is located in its intended final position. If the cargo unit is located in its intended final position, fully automated locking of the cargo unit in the final position is performed. It is then established or confirmed fully automatically whether the locking of the cargo unit in the final position has been performed correctly. If not, a warning signal is sent.

According to another exemplary embodiment of the present disclosure, an external electronic loading instruction is accepted via a data interface and the loading procedure is regulated fully automatically on the basis of the loading instruction as well as sensor measured data recorded during the loading procedure.

According to another exemplary embodiment of the present disclosure, an external electronic unloading instruction is accepted via the data interface and the unloading procedure is then regulated fully automatically on the basis of the unloading instruction and sensor measured data recorded during the unloading procedure.

Alternatively or additionally, the automatic conveyor system and the bolt system may also be activated via a manual input at the operating and display unit, if identification and/or an electronic loading or unloading instruction are not available.

The present disclosure may allow fully automated transport of ULDs in the cargo space and a similar locking or unlocking at the placement location, without manual interventions of the loading personnel in the cargo space being required for this purpose. The loading or unloading procedure may thus be significantly accelerated. Errors due to manual processing steps may be prevented. In addition, it may no longer be necessary for the loading personnel to have to move in a cramped posture in low-ceilinged cargo spaces. Local operating panels in the cargo space may be dispensed with in the field of main deck cargo spaces.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
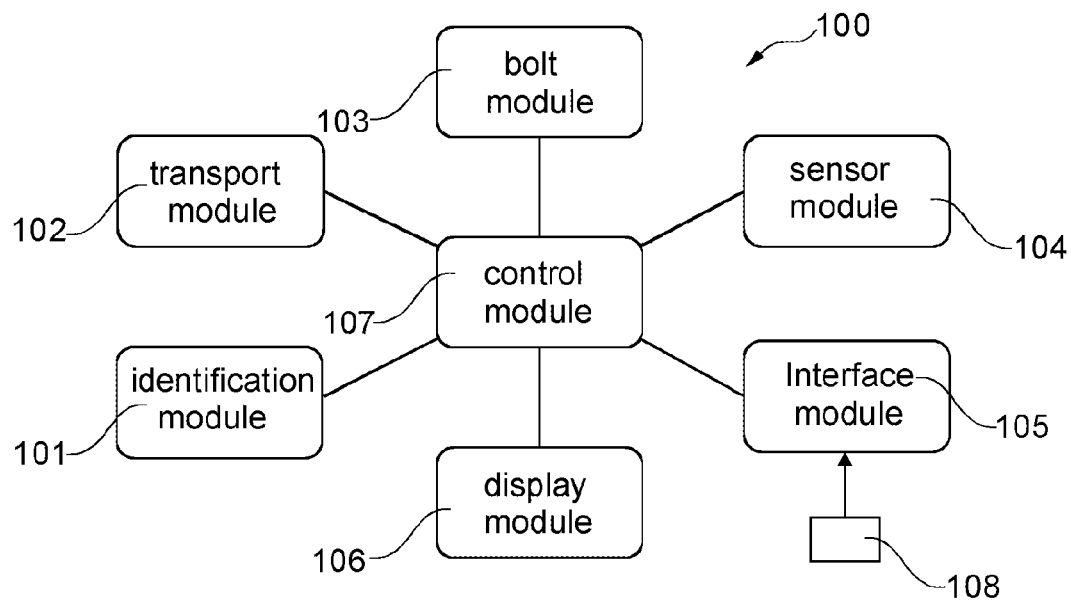
FIG. 1 shows a cargo loading system according to an exemplary embodiment of the present disclosure.

FIG. 1 shows a cargo loading system 100 according to an exemplary embodiment of the present disclosure. The cargo loading system 100 has an identification module 101, a transport module 102, a bolt module 103, a sensor module 104, an interface module 105, a display module 106, a central control module 107, as well as an external unit 108 for delivering the TARGET data.

The modules 101 to 106 are connected to the control module 107. The corresponding communication connections can be provided in wired or, if desired, wireless form. The data connection between the TARGET data provision unit 108 (which can be a terrestrial central computer, for example) and the interface module 105 can also be implemented as wireless.

The various modules may be implemented as individual components or assembled into combined units.

An automatic identification system is provided for identification of the ULDs, which has one or more identification modules 101. The identification of the ULDs can be performed via an RFID transponder, for example, which is attached to the corresponding ULD. The identification can also be performed via an image recognition of the ULD code, for example, the IATA number. Optical sensors having corresponding image recognition software are provided for this purpose.

The conveyor system has one or more of the transport modules 102, which are used for the automated transport of the ULDs in the cargo space of the transport means. These drives can be driven by electric power, for example, and can be implemented in the form of so-called power drive units, PDUs. Air cushion systems can also be provided additionally or alternatively.

The automated bolt system has one or more of the bolt modules 103, which can fix the ULDs at the placement locations in the cargo space and also unlock them again fully automatically.

Optical, capacitive, magnetic, or other sensors can be provided both in the transport modules and also in the bolt modules, which can detect where a corresponding ULD is currently located and whether the bolt module has properly locked or unlocked the ULD.

For all of these objects, a sensor system having one or more of the sensor modules 104 is provided, with the aid of which the ULD movements and positions can be recognized and tracked. In addition to optical sensors, alternatively or additionally, other sensors such as ultrasonic transducers can also be used as distance sensors, for example. In one example, individual sensors of the sensor system can recognize the locking state of the ULDs at the corresponding placement location in the cargo space. Proximity switches can be provided on the individual bolt modules for this purpose, for example.

At least one data interface 105 is provided for exchanging external data. The external data is the loading and unloading instruction from the central unit 108, for example. This data exchange can be performed, for example, via the onboard network, a USB stick or another portable memory component, a wireless data connection to a mobile device, or an RFID chip on the loading papers.

A local display and signal unit in the form of a display module 106 can also be provided on the cargo space, which is a display screen or signal lamps, for example. The data can also be output for display at remote positions for example, in the cockpit or at a ground station, via the data interface.

All modules are connected to the control module 107, which is implemented to analyze all TARGET data and ACTUAL data and to activate the conveyor system having the transport modules 102. The control module additionally provides the display module 106 with the corresponding information data which are to be displayed. The loading instruction of the aircraft in electronic form is required as an external component. The loading instruction defines, inter alia, the position of the individual ULDs in the cargo spaces. This information can be transmitted wirelessly to the interface 105.

Figure 2:
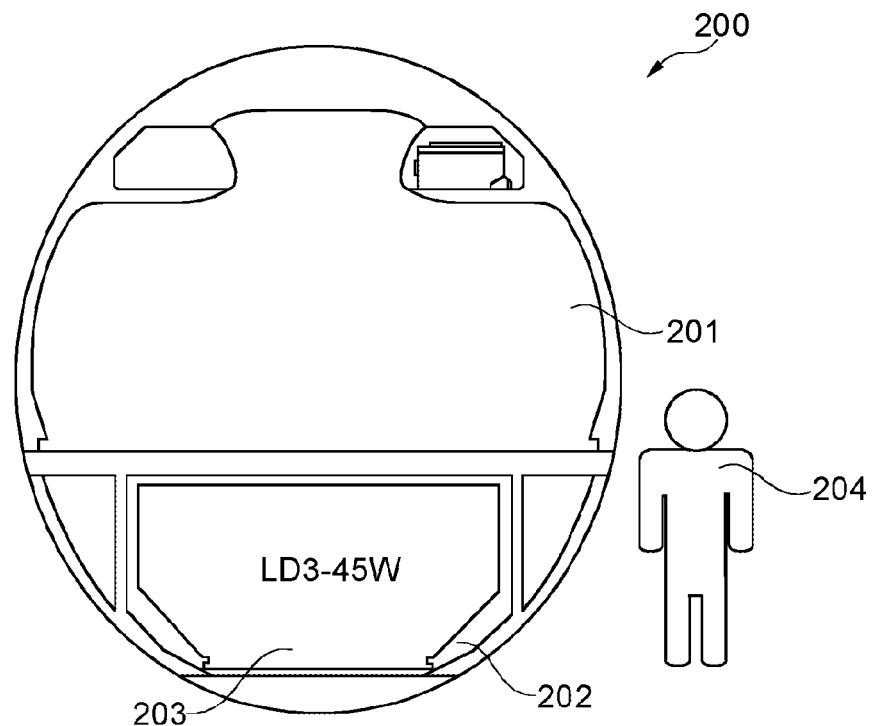
FIG. 2 shows a cross-sectional view through the fuselage of an aircraft having a cargo loading system according to an exemplary embodiment of the present disclosure.

FIG. 2 shows a cross-section through an aircraft fuselage of an aircraft 200. The fuselage has a passenger cabin 201 and a cargo space 202 located underneath, in which multiple cargo units 203 (ULDs) are located, for example, in the form of cargo containers or pallets. The height of the cargo space may only be approximately 1,285 m in the present case and is therefore significantly less than the typical standing height of an adult person 204. Instead of the passenger cabin, an upper deck cargo space can also be provided in the case of a cargo aircraft.

Not least for this reason, it may be advantageous that the cargo loading system according to one of various aspects the present disclosure allows fully automated loading and unloading of the individual freight units.

Figure 3:
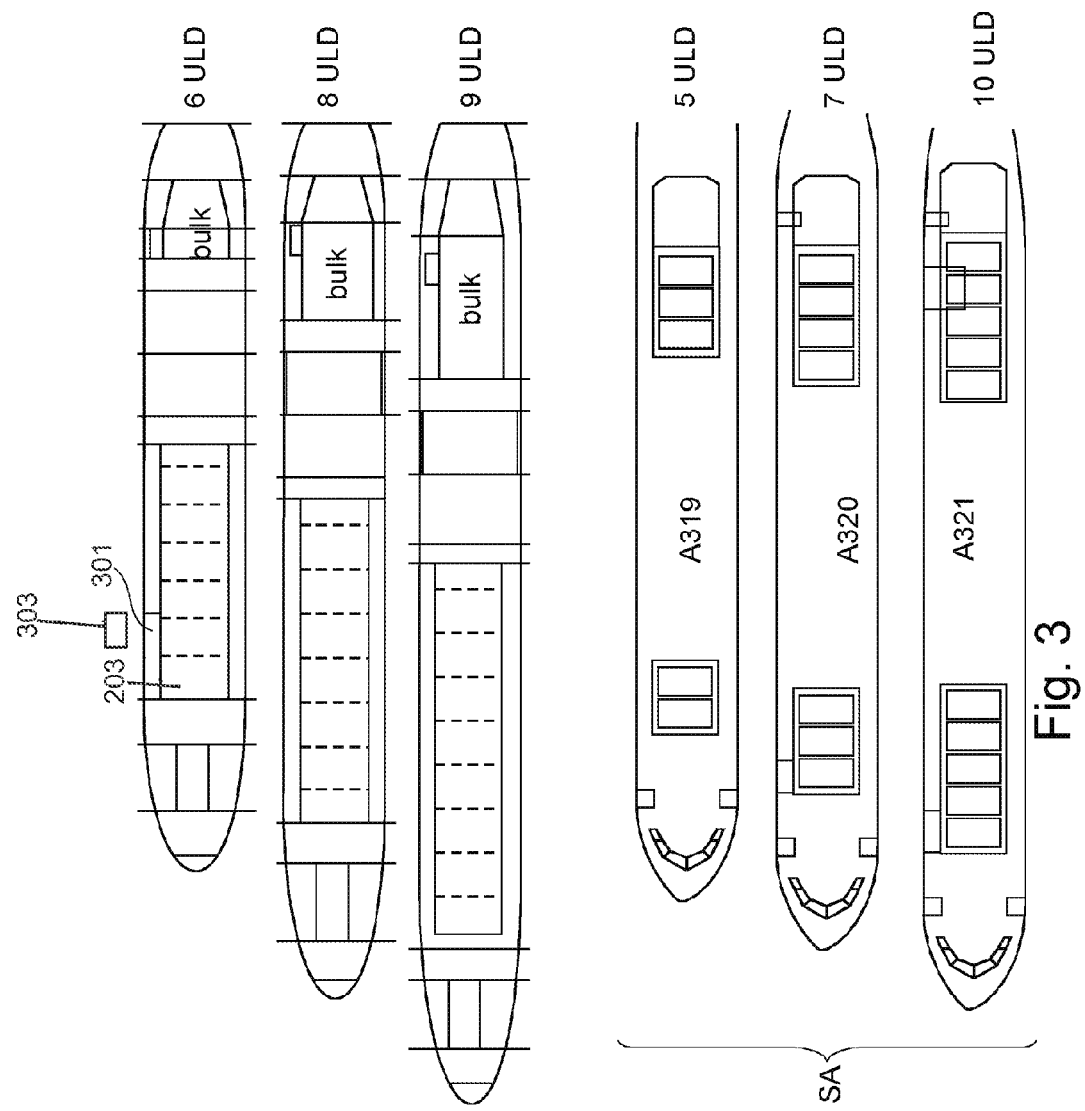
FIG. 3 shows aircraft fuselages according to multiple exemplary embodiments of the present disclosure.

FIG. 3 shows multiple aircraft types. The upper class has six placement spaces for ULDs 203 in the cargo space, for example. The reference numeral 301 identifies the access to the cargo space, i.e., its opening to the outside.

In the aircraft shown underneath, eight ULDs are provided in the front cargo space or nine ULDs are provided in the front cargo space, respectively.

The three lower aircraft fuselages show so-called single aisle classes. These may be the Airbus A319 with two ULDs in the front area and three ULDs in the rear area, the Airbus A320 with three ULDs in the front area and four ULDs in the rear area, and the Airbus A321 having five ULDs in each of the front and rear areas.

Figure 4A:
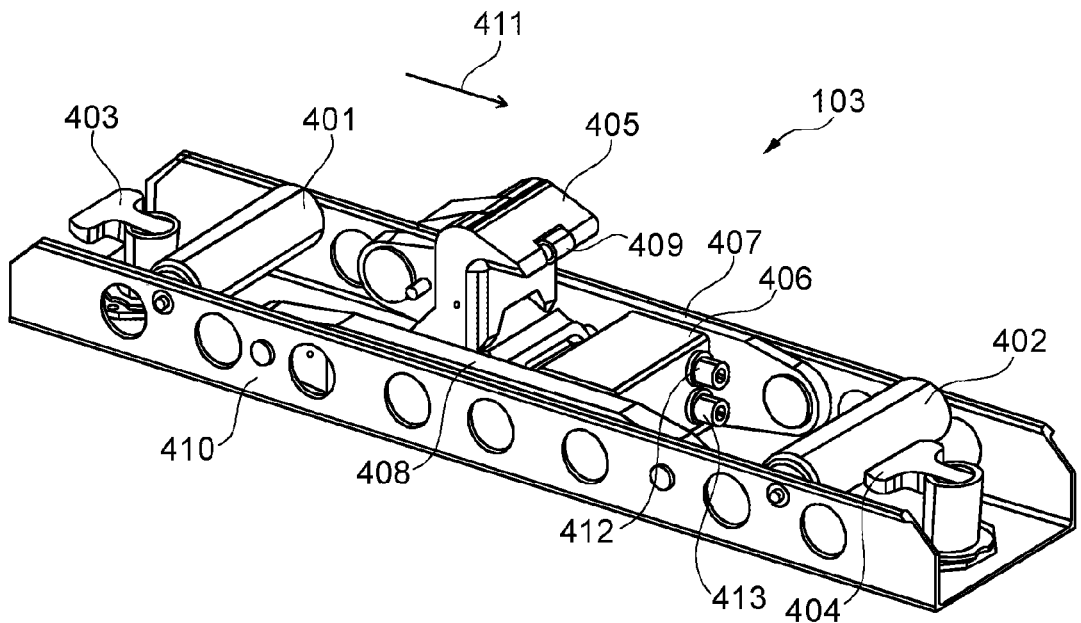
FIG. 4A shows an automated bolt module for a cargo loading system according to an exemplary embodiment of the present disclosure.

FIG. 4A shows a bolt module 103 for a cargo loading system according to an exemplary embodiment of the present disclosure. The bolt module 103 has a frame 410 in the form of a U-profile, which has a rear roller element 401 and a front roller element 402. During the loading procedure, the corresponding cargo unit is moved from left to right in the direction of the arrow 411. In addition, a left lateral reinforcement part 407 and a right lateral reinforcement part 408 are provided, which are located on the inner walls of the U-profile 410.

The bolt device 405, which has a roller 409, is located between these two reinforcement parts 407, 408. The bolt device 405 is in the folded-up (i.e., locked) state. If the bolt device 405 is folded down to the left, the roller 409 is located on the top side of the bolt module and the cargo unit travels over the bolt without touching the roller. The bolt is only triggered upon locking when the ULD is located over the bolt. The bolt snaps up slightly until the roller is on the base of the ULD. When the ULD has passed the bolt, the bolt snaps all the way up. The bolt 405 is folded up or down with the aid of the stepping motor 406. The stepping motor 406 has two electrical terminals 412, 413 for this purpose.

The reference numerals 402 and 403 identify quick-acting closures of the bolt module for fastening on the cargo space floor.

The bolt module 103 of FIG. 4A additionally has a rotary spring for orienting the bolt, a pressure part for force transmission to the bolt, and an incremental encoder for the position recognition of the bolt. Rotary spring, pressure part, and incremental encoder are not visible in the figure.

Figure 4B:
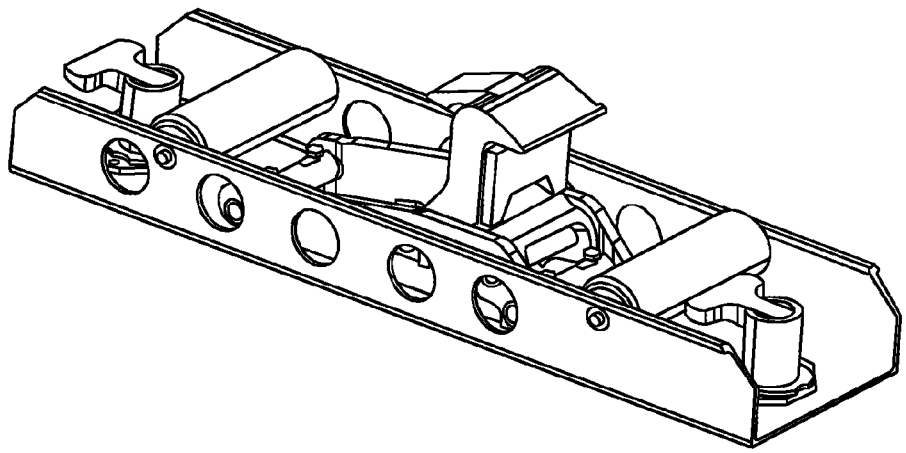
FIG. 4B shows a manually-operated bolt module.

FIG. 4B shows a bolt module 103 which is to be operated by hand.

Figure 5A:
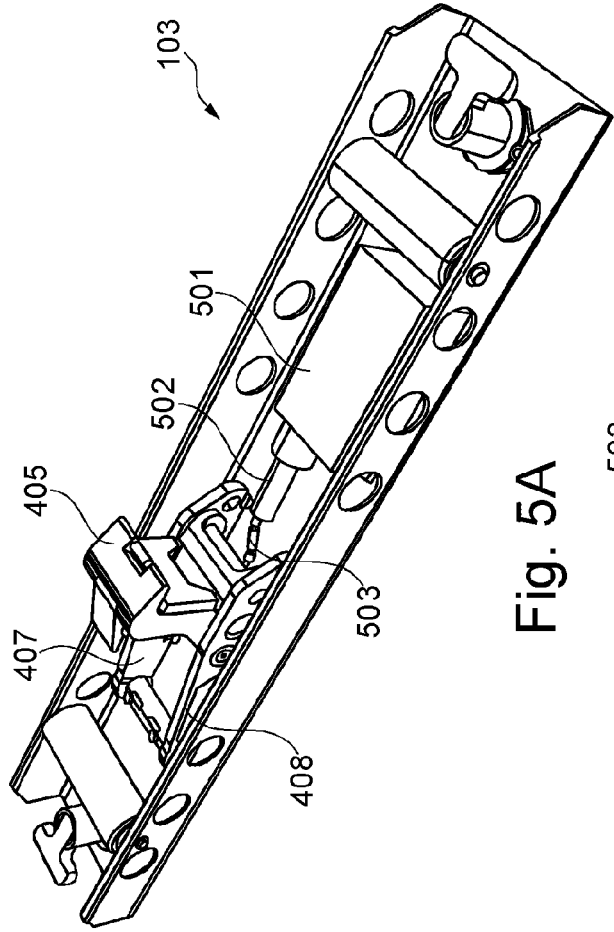
FIG. 5A shows a bolt module for a cargo loading system according to another exemplary embodiment of the present disclosure.
Figure 5B:
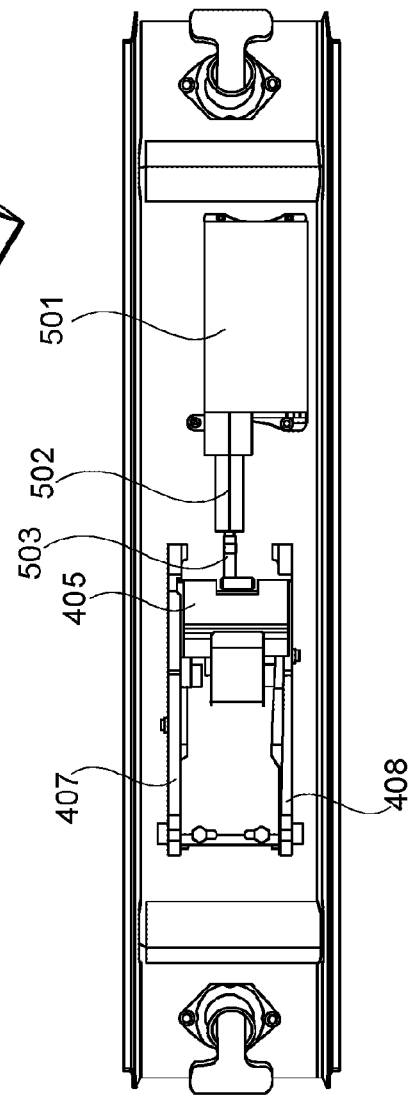
FIG. 5B shows a further view of the bolt module of FIG. 5A.

FIG. 5A shows an automated bolt module 103 for a cargo loading system according to another exemplary embodiment of the present disclosure. A lift cylinder device 501, 502 is provided, which is moved electrically, pneumatically, or hydraulically in order to actuate the bolt device 405. A universal joint 503 for force transmission between lift cylinder and bolt, as well as a Hall sensor for position recognition of the bolt, are provided. FIG. 5B shows the exemplary embodiment of FIG. 5A in a top view.

Figure 6:
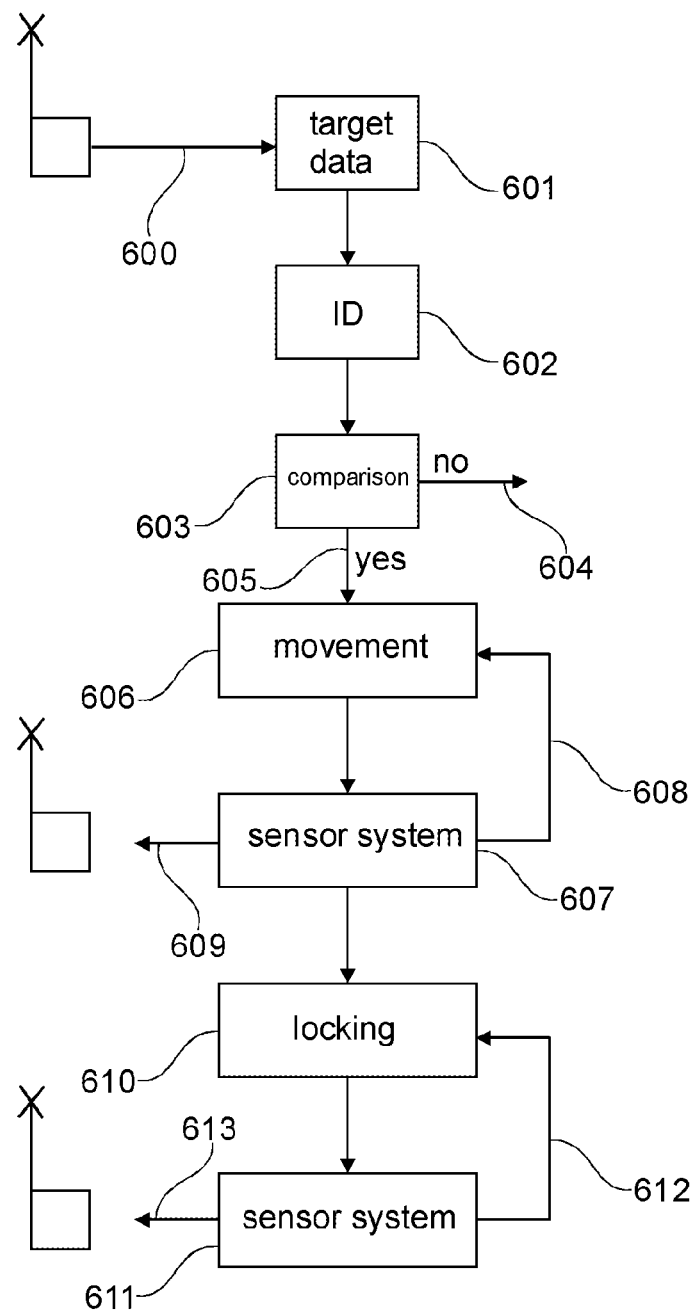
FIG. 6 shows a flowchart of a loading method according to an exemplary embodiment of the present disclosure.

FIG. 6 shows a flowchart of a loading method according to an exemplary embodiment of the present disclosure. In 600, loading data (loading instruction) are transmitted to the control module. The TARGET data are determined therefrom in 601. In other words, the loading instruction for the cargo space is electronically provided to the control module via an external interface as TARGET data, for example in form of a number indicating where the PDU has to be placed in the cargo space (placement location). In 602, a cargo unit is conveyed through the cargo door into the cargo space and automatically identified via the automated identification system. The corresponding ACTUAL data are determined in this way.

In 603, the control module compares the data of the identification to the loading instruction and signals whether the procedure has run correctly up to this point or whether incorrect loading has occurred, for example, because an incorrect cargo unit was loaded. If incorrect loading has occurred or if another malfunction is detected, a corresponding error signal 604 is output to a display device.

If all has run as planned, a corresponding signal is transmitted to a display unit and the control unit sends further commands to the conveyor system in 605. In 606, the PDU of the conveyor system (and therefore the cargo unit) is moved and in 607 this movement is monitored by the sensor system. If the cargo unit is not yet located at the provided final position, a corresponding regulating signal 608 is transmitted to the conveyor system, after which the cargo unit is moved further. The control unit can also transmit corresponding information data to the display unit in this phase (609).

Fully automated locking of the cargo unit in the final position is performed in 610. This locking procedure is monitored by the sensor system in 611 and the locking procedure is performed once again if necessary in 612, until the locking has occurred correctly and has been detected. This procedure can also be documented and corresponding data can be transmitted to the display unit in 613.

Therefore, if the ULD is identified as correct in 602, the control unit activates the conveyor system. It transports the cargo unit to its placement location defined in the loading instruction.

The movement of the cargo unit in the cargo space is tracked via the sensor system. These data are required for the control of the conveyor system and the bolt system, but can also be used, for example, for an analysis of the loading procedure in the cargo space or in an external interface in the cockpit on a mobile display of the onboard crew or another external user.

Upon reaching the placement location, the cargo unit is automatically locked (610). The sensor system recognizes the secure locking of the ULD.

The ULD is identified in the control system on the loading instruction as "directly loaded and locked". Therefore, precise documentation of the loading state of a cargo space may result during the loading procedure. It can then be exported via an external interface, for example.

Alternatively, reaching the placement location and locking of the freight unit can be displayed locally and/or remotely.

The unloading of a cargo space is performed in the same way. In this case, an unloading instruction specifies the ULDs to be unloaded similarly to the loading instruction. The control system causes the unlocking and removal of the ULDs from the cargo space.

Figure 7:
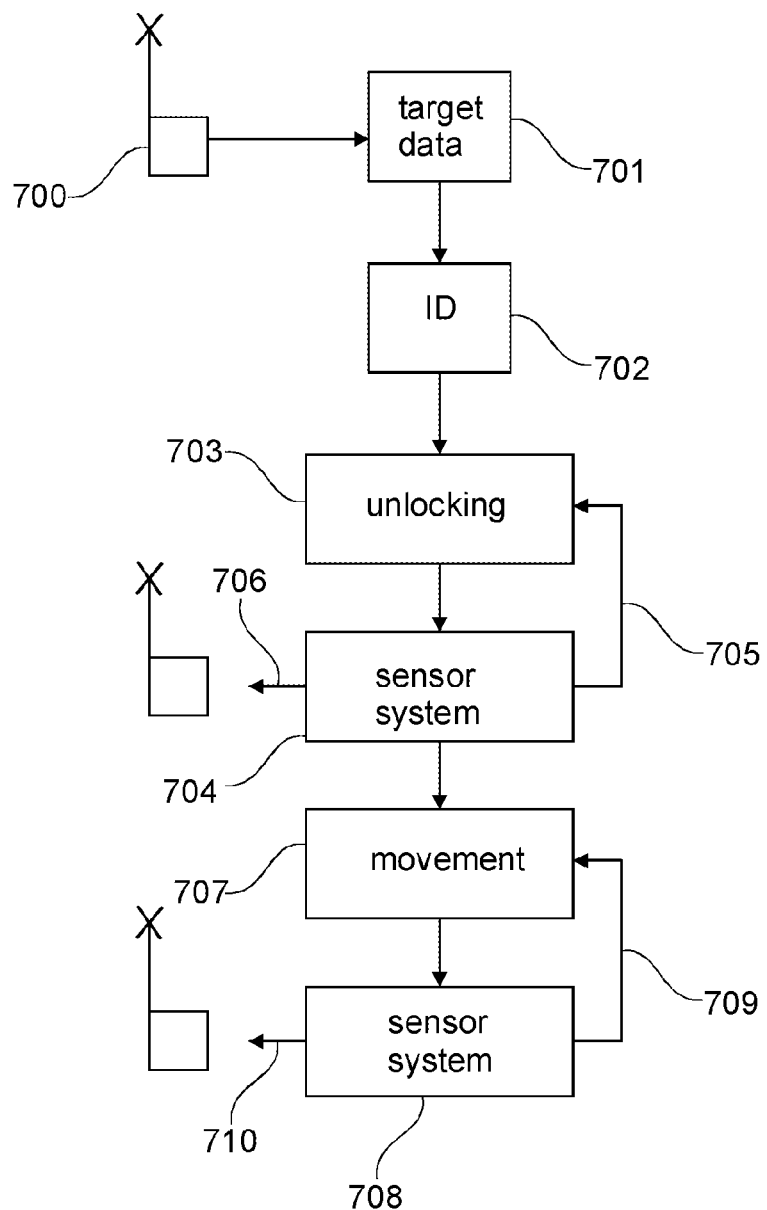
FIG. 7 shows a flowchart of an unloading method according to an exemplary embodiment of the present disclosure.

FIG. 7 shows an example of such an unloading procedure. In 700, the unloading data (unloading instruction) are transmitted to the controller and TARGET data are generated in 701. In 702, the corresponding ULD is identified and then unlocked in 703. The sensor system 704 monitors the unlocking procedure and correspondingly readjusts (705) if the unlocking procedure is not yet completed. A movement of the ULD then occurs in 707. This movement is also tracked by a sensor system in 708 and can be readjusted in 709. At any moment, information can be transmitted to an external display unit, so that the unloading procedure can be documented and the system status can be displayed at any moment (see 706, 710, for example).

In cargo spaces having anti-rollout bolts, these can also be activated by the control system during unloading. In this case, however, it may also be ensured by the system that a correctly positioned high loader 303, for example, for receiving the ULD is located in front of the open cargo door 301 (FIG. 3). The correct positioning of the high loader 303 can be established by a corresponding sensor system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A cargo loading system for a cargo space of a transport means, the cargo loading system comprising:
   a conveyor system having one or more transport modules for a fully automated transport of a cargo unit from an entry of the cargo space to a final position in the cargo space;
   a bolt system having a bolt module for an automated locking of the cargo unit in the final position; and
   a sensor system having one or more sensor modules that recognize and track the cargo unit as the cargo unit moves in the cargo space,
   wherein the sensor system recognizes a high loader positioned at the entry of the cargo space to receive the cargo unit.

2. The cargo loading system according to claim 1, wherein the conveyor system comprises an air cushion system or electrical drives.

3. The cargo loading system according to claim 1, wherein the bolt module comprises a stepping motor for the automated locking and unlocking of the cargo unit.

4. The cargo loading system according to claim 1, wherein the bolt module has a lift cylinder for the automated locking and unlocking of the cargo unit.

5. The cargo loading system according to claim 1, further comprising:
an automated identification system having an identification module for identification of the cargo unit.

6. The cargo loading system according to claim 1, further comprising:
a data interface for receiving an external loading instruction; and
a control unit for controlling and regulating the conveyor system based on the loading instruction.

7. The cargo loading system according to claim 6, wherein the control unit is further configured to compare TARGET data, which correspond to the loading instruction, to ACTUAL data, which are provided by the sensor system and correspond to an ACTUAL state in the cargo space.

8. The cargo loading system according to claim 1, further comprising:
a display and signal unit, which is situated on the cargo space and is implemented to receive information data from the control unit and to display the information data to a user.

9. An aircraft, comprising:
a cargo space;
a cargo loading system for the cargo space including:
a conveyor system having one or more transport modules for a fully automated transport of a cargo unit from an entry of the cargo space to a final position in the cargo space;
a bolt system having a bolt module for an automated locking of the cargo unit in the final position,
a sensor system having one or more sensor modules that recognize and track the cargo unit as the cargo unit moves in the cargo space,
wherein the sensor system recognizes a high loader positioned at the entry of the cargo space to receive the cargo unit.

10. The aircraft according to claim 9, wherein the conveyor system comprises an air cushion system or electrical drives.

11. The aircraft according to claim 9, wherein the bolt module comprises a stepping motor for the automated locking and unlocking of the cargo unit.

12. The aircraft according to claim 9, wherein the bolt module has a lift cylinder for the automated locking and unlocking of the cargo unit.

13. The aircraft according to claim 9, further comprising:
an automated identification system having an identification module for identification of the cargo unit.

14. A method for fully automated loading and unloading of a cargo space of a transport means, comprising:
fully automated transporting of a cargo unit from an entry of the cargo space to a final position in the cargo space by a conveyor system having one or more transport modules;
recognizing and tracking the cargo unit as the cargo unit moves in the cargo space with a sensor system having one or more sensor modules and the sensor system recognizes a high loader positioned at the entry of the cargo space to receive the cargo unit;
confirming that the cargo unit is located in its intended final position;
fully automated locking of the cargo unit in the final position; and
confirming that the locking of the cargo unit in the final position by a bolt system having a bolt module has been performed correctly.

15. The method according to claim 14, further comprising:
receiving an external electronic loading instruction via a data interface; and
fully automated controlling of the loading procedure on the basis of the loading instruction and sensor measured data recorded during the loading procedure.

16. The method according to claim 14, further comprising:
receiving an external electronic unloading instruction via the data interface; and
fully automated controlling of the unloading procedure based on the unloading instruction and sensor measured data recorded during the unloading procedure.

* * * * *